(12) United States Patent
Liang et al.

(10) Patent No.: US 6,841,231 B1
(45) Date of Patent: Jan. 11, 2005

(54) FIBROUS COMPOSITE ARTICLE AND METHOD OF MAKING THE SAME

(75) Inventors: Bei-Hong Liang, Naperville, IL (US); Roger E. Koch, St. Charles, IL (US); John Peter Walsh, St. Charles, IL (US); Bob Allen, St. Charles, IL (US); Hanmin Dong, Fort Collins, CO (US); Wen-Ning (Sally) Chan, College Station, TX (US)

(73) Assignee: Masonite Corporation, Tampa, FL (US)

( * ) Notice: Subject to any disclaimer, the term of this patent is extended or adjusted under 35 U.S.C. 154(b) by 153 days.

(21) Appl. No.: 09/635,824

(22) Filed: Aug. 10, 2000

(51) Int. Cl.$^7$ .......................... B32B 25/02; B32B 27/04; B32B 21/14; D04H 5/00; D02G 3/00

(52) U.S. Cl. ............................ 428/296.7; 428/292.1; 428/297.4; 428/301.4; 428/332; 428/336; 428/359; 428/364; 428/365; 428/535

(58) Field of Search ............................ 428/292.1, 359, 428/336, 332, 364, 365, 535, 296.7, 297.4, 301.4, 302

(56) References Cited

U.S. PATENT DOCUMENTS

| | | | |
|---|---|---|---|
| 1,680,896 A | 8/1928 | Marr | |
| 3,643,710 A | 2/1972 | Fitzgibbon | 144/3 R |
| 3,699,203 A | 10/1972 | Oshima et al. | 264/112 |
| 3,927,235 A * | 12/1975 | Chow | 428/302 |
| 4,131,664 A * | 12/1978 | Flowers et al. | 264/510 |
| 4,293,456 A | 10/1981 | Reischl | 260/9 |
| 4,303,019 A | 12/1981 | Haataja et al. | 108/51.1 |
| 4,528,117 A | 7/1985 | Scholl et al. | 252/312 |
| 4,528,153 A | 7/1985 | Scholl et al. | 264/109 |
| RE32,329 E | 1/1987 | Paszner | 264/108 |
| 4,810,551 A | 3/1989 | Chu | 428/106 |
| 4,857,145 A | 8/1989 | Villavicencio | 162/19 |
| 5,151,238 A | 9/1992 | Earl et al. | 264/136 |
| 5,334,445 A | 8/1994 | Ruyter et al. | 428/284 |
| 5,348,621 A | 9/1994 | Rudy | 162/100 |
| 5,350,624 A | 9/1994 | Georger et al. | 428/219 |
| 5,352,510 A | 10/1994 | Laughlin et al. | 428/304.4 |
| 5,393,214 A | 2/1995 | Irie et al. | 425/81.1 |
| 5,397,067 A | 3/1995 | Akiyama et al. | 241/28 |
| 5,415,821 A | 5/1995 | Irie et al. | 264/113 |
| 5,433,825 A | 7/1995 | Minor et al. | 162/86 |
| 5,441,787 A | 8/1995 | Fujii et al. | 428/57 |
| 5,492,756 A | 2/1996 | Seale et al. | 428/326 |
| 5,516,472 A | 5/1996 | Laver | 264/118 |
| 5,518,677 A | 5/1996 | Deaner et al. | 264/142 |
| 5,554,330 A | 9/1996 | Flannery et al. | 264/113 |
| 5,635,123 A * | 6/1997 | Riebel et al. | 264/125 |
| 5,656,129 A | 8/1997 | Good et al. | 162/13 |
| 5,871,614 A * | 2/1999 | Turner | 162/72 |
| 6,187,137 B1 * | 2/2001 | Druecke et al. | 162/109 |
| 6,641,909 B1 * | 11/2003 | Wasylciw | 428/332 |

FOREIGN PATENT DOCUMENTS

| | | |
|---|---|---|
| CN | 1213604 | 4/1999 |
| GB | 2 251 002 A | 6/1992 |
| JP | 8109309 | 4/1996 |
| JP | 10264117 | 10/1998 |
| WO | WO 97/49531 | 12/1997 |
| WO | WO 05/05294 | 2/2000 |
| WO | WO 00/69607 | 11/2000 |

OTHER PUBLICATIONS

International Search Report dated Mar. 27, 2002, in International Application No. PCT/US01/41156.

M.M. Singh, "Pressed Boards from Bamboo Dust," *Indian Pulp and Paper*, pp. 201 and 203 (Sep. 1960).

T.R. Naffziger et al., "Structural Board from Domestic Timber Bamboo," *Tappi*, vol. 44, No. 2, pp. 108–112 (Feb. 1961).

M.M. Singh et al., "Some Investigation on Pressed Boards From Bamboo," *Indian Pulp and Paper*, pp. 651–656 (Jun. 1969).

D. Fengel et al., "A Chemical and Ultrastructural Study of the Bamboo Species *Phyllostachys makinoi* Hay," *Wood and Science Technology*, vol. 18, pp. 103–112 (1984).

Seema Jain et al., "Mechanical Behaviour of Bamboo Composite," J. of Mat. Sci. vol. 27, pp. 4598–4604 (1992).

* cited by examiner

*Primary Examiner*—B. Hamilton Hess
*Assistant Examiner*—L. Ferguson
(74) *Attorney, Agent, or Firm*—Liniak, Berenato & White, LLC

(57) ABSTRACT

Fibrous composite articles and method of manufacturing the same are disclosed. The preferred fibrous materials have average fiber lengths of less than about 2 millimeters, and are obtained from industrial hemp hurd, kenaf hurd, and/or the culms of various species of vegetable bamboo. The fibers are combined with a binder resin and, optionally, a sizing agent to form a mat that is consolidated under heat and pressure to form the composite articles. The formed articles exhibit strength and durability characteristics at least roughly equivalent, if not superior, to those of conventional wood-based fibrous composite articles.

35 Claims, No Drawings

FIBROUS COMPOSITE ARTICLE AND METHOD OF MAKING THE SAME

BACKGROUND OF THE INVENTION

1. Field of the Invention

The invention generally relates to fibrous consolidated composite articles, and to methods of making the same and, more specifically, the invention relates to composite articles made from the fibers of hemp hurd, kenaf, vegetable bamboo, and/or mixtures thereof.

2. Brief Description of Related Technology

One type of molded composite article is a cellulosic (or woody) composite which includes man-made boards of bonded wood sheets and/or lignocellulosic materials, commonly referred to in the art by the following exemplary terms: fiberboards such as hardboard, medium density fiberboard, and softboard; particleboards such as chipboard, flakeboard, particleboard, strandboard, and waferboard. Wood composites also include man-made boards comprising combinations of these materials. These wood composites can be used as columns, floors, ceilings, walls, doors, siding and stairs in the construction of homes, offices, and other types of buildings, as well as furniture components, such as chairs, tables, countertops, cabinets, and cabinet doors, for example.

Many different methods of manufacturing wood composites are known in the art such as, for example, those described in Hsu et al. U.S. Pat. No. 4,514,532 and Newman et al. U.S. Pat. No. 4,828,643, the disclosures of which are hereby incorporated herein by reference. The principal processes for the manufacture of fiberboard include: (a) wet felted/wet pressed or "wet" processes; (b) dry felted/dry pressed or "dry" processes; and, (c) wet felted/dry pressed or "wet-dry" processes. Synthetic binder resins, such as amino resins, urea-formaldehyde resins, phenol-formaldehyde resins, or modified phenol-formaldehyde resins, are often used as binders in these processes. Other binders include, but are not limited to, starches, asphalt, and gums.

Cellulosic fibers such as, for example, wood fibers are prepared by the fiberization of woody chip material in a pressurized refiner, an atmospheric refiner, a mechanical refiner, and/or a thermochemical refiner. Generally, in a wet process, the cellulosic fibers are blended in a vessel with large amounts of water to form a slurry. The slurry preferably has sufficient water content to suspend a majority of the wood fibers and preferably has a water content of at least 95 percent by weight (wt. %). The water is used to distribute a synthetic resin binder, such as a phenol-formaldehyde resin over the wood fibers. This mixture is deposited onto a water-pervious support member, such as a fine screen or a Fourdrinier wire, and pre-compressed, whereby much of the water is removed to leave a wet mat of cellulosic material having, for example, a moisture content of at least about 50 wt. % based on the weight of dry cellulosic material. The wet mat is transferred to a press and consolidated under heat and pressure to form the molded wood composite.

A wet-dry forming process can also be used to produce wood composites. Preferably, a wet-dry process begins by blending cellulosic material (e.g., wood fibers) in a vessel with a large amount of water. This slurry is then blended with a resin binder. The blend is then deposited onto a water-pervious support member, where a large percentage (e.g., 50 wt. % or more) of the water is removed, thereby leaving a wet mat of cellulosic material having a water content of about 40 wt. % to about 60 wt. %, for example. This wet mat is then transferred to a zone where much of the remaining water is removed by evaporation by heat to form a dried mat. The dried mat preferably has a moisture content of about 10 wt. % or less. The dried mat can be finished at this point or transferred to a press and consolidated under heat and pressure to form a higher density wood composite which may be a flat board or a molded product, for example. The product can be molded into various shapes or geometries depending on the intended use.

In a dry forming process, filler material, such as cellulosic fibers, is generally conveyed in a gaseous stream or by mechanical means. For example, the fibers supplied from a fiberizing apparatus (e.g., a pressurized refiner) may be coated with a thermosetting synthetic resin, such as a phenol-formaldehyde resin, in a blowline blending procedure, wherein the resin is blended with the fiber with the aid of air turbulence. Thereafter, the resin-coated fibers from the blowline can be randomly formed into a mat by air blowing the fibers onto a support member. Optionally, the fibers, either before or after formation of the mat, can be subjected to pre-press drying, for example in a tube-like dryer. The formed mat, typically having a moisture content of less than about 10 wt. %, and preferably about 5 wt. % to about 10 wt. %, then is pressed under heat and pressure to cure the thermosetting resin and to compress the mat into an integral consolidated structure.

As an alternative to conventional pressing, steam injection pressing is a consolidation step that can be used, for example, under certain circumstances in the dry and wet-dry process production of consolidated cellulosic composites. In steam injection pressing, steam is injected through perforated heating press platens, into, through, and then out of a mat that includes the synthetic resin and the filler material. The steam condenses on surfaces of the filler and heats the mat. The heat transferred by the steam to the mat as well as the heat transferred from the press platens to the mat cause the resin to cure.

The cost of manufacturing fiberboards is sensitive to the cost of raw materials. Traditionally, wood clearly has been the most important raw material in fiberboard manufacture, and because of its abundance, its costs have remained reasonably low. However, as the supply of preferred wood begins to diminish, its cost correspondingly increases. The raw material cost of wood may achieve a level where wood-alternatives may be considered viable options in the manufacture of fiberboards. Known non-wood raw material substitutes for fiberboard manufacture are limited to mineral fibers and to biological lignocellulosic fibers derived from annual plants such as bagasse, bamboo stalks, barley stalks, corn stalks, cotton stalks, flax shives, jute stalks, kenaf stalks, oat stalks, rice stalks/husks, rye stalks, sugarcane, and wheat stalks/straw. These raw materials can serve as viable substitutes for wood in wood-based fiberboards, however, these raw materials also suffer certain disadvantages in that they may not exhibit structural characteristics comparable to those of wood-based fiberboards.

Accordingly, it would be desirable to provide a nonwood-based, fibrous composite having strength and durability characteristics, and other related structural characteristics at least roughly equivalent to those of traditional wood-based, fibrous composite products. Furthermore, it would be desirable to provide nonwood-based, fibrous composites having structural characteristics superior to those of traditional wood-based, fibrous composites. It also would be desirable to provide an abundant raw material alternative to wood as a source for the fibers in the manufacture of fibrous composites.

SUMMARY OF THE INVENTION

One aspect of the invention is a nonwood fibrous composite article containing fibrous material having an average fiber length of less than about 2 millimeters (mm) and a cured, binder resin, the resin preferably being present in an amount of about 2 percent by weight (wt. %) to about 8 wt. % based on the weight of the fibrous material prior to curing, wherein the fibrous material comprises a species selected from the group consisting of hemp hurd, kenaf hurd, vegetable bamboo culms, and combinations thereof.

Another aspect of the invention is a method of making fibrous composite articles. The method includes the steps of providing and refining fibers selected from the group consisting of hemp hurd, kenaf hurd, vegetable bamboo culms, and combinations thereof. The fibers are combined with a binder resin to form a mat and, thereafter, the mat is compressed and dried to produce the fibrous composite article. Optionally, the mat may include a sizing agent prior to compression. The formed composite is advantageous in that it does not utilize woody raw materials and, instead, employs the fibrous material of a more plentiful resource, i.e., an annual plant.

Further features of the invention may become apparent to those skilled in the art from a review of the following detailed description, taken in conjunction with the appended claims. While the invention is susceptible of embodiments in various forms, described hereinafter are specific embodiments of the invention with the understanding that the present disclosure is intended as illustrative, and is not intended to limit the invention to the specific embodiments described herein.

DETAILED DESCRIPTION OF THE PREFERRED EMBODIMENTS

The invention is directed to a fibrous composite article containing fibrous material having an average fiber length of less than about 2 mm and a cured, binder resin preferably present in an amount of about 2 wt. % to about 8 wt. % based on the weight of the fibrous material prior to curing, wherein the fibrous material comprises a species selected from the group consisting of hemp hurd, kenaf hurd, vegetable bamboo culms, and combinations thereof.

The invention also is directed a method of making the fibrous composite articles. The inventive method includes the steps of providing and refining fibers selected from the group consisting of hemp hurd, kenaf hurd, vegetable bamboo culms, and combinations thereof. The fibers are combined with a binder resin to form a mat and, thereafter, the mat is compressed and dried to produce the fibrous composite article. Optionally, the mat may include a sizing agent prior to compression. The formed composite is advantageous in that it does not utilize woody raw materials and, instead, employs the fibrous material of a more plentiful resource, i.e., an annual plant.

The fibrous material comprising the article preferably has a fiber length of about 0.3 mm to about 1.6 mm and a specific gravity of about one to about 1.2. Such fiber lengths can be obtained by subjecting a mass of the fiber source to the action of one or more conventional refiners such as, for example, a pressurized refiner, an atmospheric refiner, a mechanical refiner, a thermochemical refiner, and/or a combination of these refiners. The mass of fibers subjected to the refining process typically are obtained from the species selected from the group consisting of hemp hurd, kenaf hurd, vegetable bamboo culms, and combinations thereof. The obtained fibers typically have a fiber length of less than about 2 mm prior to undergoing the fibrization processing in the aforementioned refiner(s).

In the art of consolidated composite products, moisture content (percentage) is expressed as the weight of water contained in the fibrous material divided by the dry weight of the fibrous material. Thus, fibrous material containing 50% water and 50% dry fibrous material has a moisture content of 100%. The fibrous material specified according to the present invention desirably has a moisture content of less than about 30% and, preferably, has a moisture content of less than about 10%. More preferably, however, the fibrous material has a pre-consolidation moisture content of about 3 wt. % to about 5 wt. %, and most preferably it has a moisture content of about 4 wt. % to about 4.5 wt. %. Generally, a desired and/or preferred moisture content of the fibrous material can be achieved by subjecting the fibrous material to pre-consolidation drying, for example in a tube-like dryer to remove the water.

According to the invention nonwood-based fibers for use in the invention include fibers having the aforementioned characteristics and include those obtained from industrial hemp, kenaf, and from various species of vegetable bamboo. Each of these nonwood-based fibers are described in more detail below along with any desirable characteristic properties and processing conditions.

Industrial hemp is an annual fiber crop that is readily obtained from the stem stalks of *Cannabis sativa*, which is native to north-central Asia, northern Europe, India, Italy, the territories of the former Soviet Republic, the United States, and other northern climate regions. These stem stalks include two major fibers: a long bast (outer skin) fiber and a hurd (or core) fiber. The bast fibers have been used in the past for a variety of purposes, including twine, cordage, packing, and with cotton or flax in toweling and heavy fabrics. The long bast fibers have an average fiber length of about 55 millimeters (mm). Of less value are the shorter hurd fibers which, heretofore, have generated little value, and are typically discarded as an undesired by-product of processes for obtaining the bast fibers.

Contrary to prevailing public perceptions, industrial hemp is not synonymous with "marijuana," the sale of which is prohibited in many areas of the world including the United States. Industrial hemp contains less than one percent of the hallucinogenic chemical constituent, δ-9-tetrahydrocannabinol (THC), so active in "marijuana" In contrast, "marijuana" contains about 3% to about 15% of the hallucinogenic THC.

Hemp is a hearty annual plant, as its seeds germinate quickly and, under good weather conditions, can become vigorous plants within as little as about three weeks to about five weeks. Within about ten weeks, a hemp plant can grow to heights in excess of about six feet, and within about sixteen weeks the plant can grow to a height of about sixteen feet.

The hemp hurd fibers typically have an average fiber length of less than about 2 mm. Hemp hurd fibers for use in the invention preferably have an average fiber length of about 0.2 mm to about 0.8 mm, and more preferably the fibers have an average fiber length of about 0.5 mm to about 0.75 mm. The original hemp hurd fibers as obtained from the hemp stem stalks can be refined to a desired size by conventional refiners such as, for example, a pressurized refiner, an atmospheric refiner, a mechanical refiner, and/or a thermochemical refiner.

The chemical composition of hemp hurd fibers is generally similar to that of many wood-based fibers, with the exception that hemp hurd fibers have a higher ash content (see Table I, below). Cellulose, hemi-cellulose, and lignin are chemical constituents that are believed to provide the hemp hurd fibers with the strength characteristics desirable for combating external stresses, as well as other characteristics that contribute to good fiber/fiber bonds and good fiber/resin bonds, and water resistance. The balance of each of the fibers and wood materials listed in Table I comprises water.

TABLE I

| Constituent (wt. %) | Hemp Bast Fiber | Hemp Hurd Fiber | Eucalyptus | Pine |
|---|---|---|---|---|
| Lignin | 4 | 21 | 26 | 28 |
| Cellulose | 65 | 40 | 46 | 42 |
| Hemicellulose | 12 | 18 | 27 | 25 |
| Ash | 5 | 4 | 1 | 1 |

A formed article using hemp hurd fibers may have a smoothness value of about 2 to about 5, and preferably about 2.1 to about 3.8. Smoothness value is measured using a 60° light reflectance technique generally known by those having ordinary skill in the art. Additionally, the formed article typically has an internal bond strength of about 140 psi (about 965 kPa) to about 250 psi (about 1723 kPa), and preferably about 150 psi (about 1034 kPa) to about 200 psi (about 1378 kPa). The article has a cleavage value of about 45 pounds (about 20 kilograms (kg)) to about 65 pounds (about 29 kg), and preferably about 60 pounds (about 27 kg) to about 65 pounds (about 29 kg). Other exemplary physical property data for products prepared in accordance with the invention are summarized in Table II, below.

little as about five weeks to about six weeks. Within about sixteen weeks, a kenaf plant can grow to heights in excess of about eleven feet, and within about twenty weeks the plant can grow to a height of about eighteen feet. See generally, T. Sellers, Jr. et al. *Kenaf Core as a Board Raw Material*, Forest Products Journal, Vol. 43, pp. 69–71 (July/August 1993); S. W. Neill et al., 1989 *Kenaf Variety Trial*, Mississippi Agricultural & Forestry Experiment Station (MAFES), Information Sheet No. 1326, pp. 1–5 (April 1990), the disclosures of which are hereby incorporated herein by reference.

Kenaf has been found to be a viable alternative to wood fibers because, for example, the annual yield of kenaf (dry basis) is about 6 tons/acre to about 12 tons/acre. In contrast southern pine trees typically require about 20 to about 25 years to produce an annual yield of about 10 tons/acre. With the annual abundance of kenaf comes the costs of harvesting, transporting, and storage. These costs, however, are likely to be outweighed by the benefits of the finished composite articles.

As noted above, kenaf hurd fibers typically have an average length of less than about 2 mm, such as about 0.6 mm. Kenaf fibers for use in the invention preferably have an average fiber length of about 0.2 mm to about 0.8 mm, and more preferably the fibers have an average fiber length of about 0.5 mm to about 0.75 mm. The original kenaf hurd fibers as obtained from the kenaf stem stalks can be refined to a desired size by conventional refiners such as, for example, a pressurized refiner, an atmospheric refiner, a mechanical refiner, and/or a thermochemical refiner.

The chemical composition of kenaf bast fibers and kenaf hurd fibers are relatively similar, however the hurd fibers have slightly less of lignin, cellulose, extractives, and ash,

TABLE II

| Hemp Hurd Fiber | Resin Content (wt. %) | OOP Caliper (inches) | OOP Specific Gravity | 24-hour Water Gain (%) | 24-hour Caliper Swell (%) | Internal Bond Strength (psi) | Cleavage (lbs) | Smoothness Value (Fine) | Smoothness Value (Course) |
|---|---|---|---|---|---|---|---|---|---|
| Fine | 3 | 0.124 | 1.05 | 28.4 | 18.8 | 186.4 | 58.5 | 2.1 | 3.1 |
| Coarse | 3 | 0.127 | 1.03 | 28.7 | 19.2 | 140.2 | 47.6 | 2.4 | 3.7 |
| Fine | 5 | 0.123 | 1.05 | 26.7 | 15.8 | 247.1 | 64.8 | 2.3 | 3.8 |
| Coarse | 5 | 0.126 | 1.03 | 24 | 14.5 | 187.2 | 53.5 | 2.4 | 3.8 |

Another suitable nonwood-based fiber for use in the invention is kenaf (*Hibiscus cannabinus* L.), which is an annual dicotyledonous fiber crop with stem stalks that can be used in the manufacture of pulp and paper products. Kenaf is a native of tropical Africa and the East Indies, where it is used for a variety of purposes, including rope, rugs, bagging, and twine, as well as for food due to the relatively high protein content of its leaves. Kenaf can be grown in southern regions of the United States such as, Alabama, California, Florida, Lousisana, Mississippi, and Texas.

Kenaf stem stalks have two major fibers: a long bast fiber typically having an average length of about 2.5 millimeters (mm) found in the outer bark of the stem stalk, and a woody hurd (or core) fiber having an average length of less than about 2 mm, such as about 0.6 mm. The bast fibers account for about 25% to about 40% of the weight of the plant, while the woody hurd fibers account for the balance. Kenaf is a hearty annual plant as its seeds germinate quickly, usually within about three days to about five days, and under good weather conditions can become vigorous plants within as and slightly higher amounts of sugar and acetyl, when compared to the bast fibers. The average chemical compositions of both of the bast fibers and core fibers are provided below in Table III.

TABLE III

| Constituent (wt. %) | Kenaf Bast Fiber | Kenaf Hurd Fiber |
|---|---|---|
| Lignin | 21.1 | 18.7 |
| Cellulose | 44.4 | 37.6 |
| Sugars | 68.6 | 70.2 |
| Extractives | 2.7 | 1.9 |
| Ash | 4.6 | 2.2 |
| Acetyl | 2.7 | 4.0 |

Simply substituting kenaf fibers for conventional wood-based fibers in the manufacture of composite articles, however, is not enough to make a suitably sturdy product. The present inventors have found that blister and central core delamination could pose significant problems when using kenaf fibers instead of the conventional wood-based materials. In order to overcome these problems the present inventors discovered that the moisture content and the press cycle conditions are preferably adjusted because the moisture/steam permeability of kenaf hurd fiber mats is much lower than that of wood fiber mats, if all other material and processing conditions remain unchanged. While not intending to be bound by any particular theory, it is believed that the cell wall structure of the kenaf hurd fibers and the relatively low density of the kenaf material is responsible for the permeability characteristics. Once the mat is pressed and the thermosetting binder resin begins to cure, there are not enough microchannels for the water/steam present in the fibers (near the core of the mat) to escape.

such as, for example, aspen, birch, hackberry, hickory, maple, mulberry, oak, and sycamore. When hardwood is used with kenaf fibers, the weight ratio of hardwood to kenaf is about 0.25:1 to about 0.67:1, preferably in a ratio of about 0.4:1 to about 0.5:1. Press operating conditions likely will change depending upon the amount of hardwood present and, based on the foregoing teachings, such conditions are determinable by those having ordinary skill in the art. Various physical property data of exemplary articles of the invention having a mixture of hardwood and kenaf fibers are summarized in Table TV, below. Softwoods, such as pine (e.g., masson pine) and fir, also can be included with kenaf fibers in weight ratios similar to those recited herein for hardwood.

TABLE IV

| Hardwood to Kenaf Ratio | OOP Caliper (inches) | OOP Specific Gravity | 24-hour Water Gain (%) | 24-hour Caliper Swell (%) | Internal Bond Strength (psi) | Cleavage (lbs) | Smoothness Value (Coarse) | Smoothness Value (Fine) |
|---|---|---|---|---|---|---|---|---|
| 100:0 | 0.125 | 1.04 | 24 | 15.3 | 279 | 95.7 | 7.1 | 4.4 |
| 40:60 | 0.124 | 1.05 | 25.7 | 16.9 | 254 | 81.9 | 5.2 | 3.1 |
| 30:70 | 0.125 | 1.04 | 25.4 | 17.8 | 218 | 91.1 | 5.3 | 2.9 |
| 20:80 | 0.119 | 1.06 | 24.8 | 17.3 | 253 | 90.3 | 4.2 | 2.5 |
| 0:100 | 0.121 | 1.02 | 24.4 | 17.7 | 224 | 82 | 4.8 | 1.9 |

Accordingly, a preferred press cycle has been developed that comprises a first press period, a breathing period, and a second press period. During the breathing period, the pressure is reduced to allow moisture from within the fibers to vent. At the end of the second press period, when the pressure is released, internal stresses caused by steam pressure trapped inside the panel are reduced and the bonding between the fibers and the resin is more complete. The more complete bonding eliminates the problem of blistering and central core delamination.

Preferred press cycle time for the first press period is about 20 seconds to about 30 seconds, more preferably about 25 seconds to about 30 seconds. A preferred breathing period is about 10 seconds to about 15 seconds, more preferably about 10 seconds to about 12 seconds. A preferred time period for the second press period is about 35 seconds to about 75 seconds, more preferably about 40 seconds to about 50 seconds. The preferred pressure during the various press periods ranges from about 700 psi (about 4823 kPa) to about 1200 psi (about 8268 kPa), more preferably about 800 psi (about 5521 kPa) to about 1100 psi (about 7579 kPa). During the preferred breathing period, the pressure is reduced to about 50 psi (about 345 kPa) to about 100 psi (about 690 kPa).

A formed article using kenaf fibers may have a smoothness value of about 2 to about 5, and preferably about 2.5 to about 4.2. Additionally, the formed article typically has an internal bond strength of about 210 psi (about 1447 kPa) to about 290 psi (about 2000 kPa), and preferably about 218 psi (about 1503 kPa) to about 279 psi (about 1923 kPa). The article may have a cleavage value of about 80 pounds (about 36 kg) to about 100 pounds (about 45 kg), and preferably about 82 pounds (about 37 kg) to about 95.7 pounds (about 43.4 kg).

A hardwood can be included with kenaf fibers. Hardwoods suitable for use in combination with kenaf fibers include those obtained from broadleafed or deciduous trees Yet another suitable nonwood-based fiber for use in the invention is that obtained from vegetable bamboo (*Bambusoideae*). More specifically, useful vegetable bamboo fibers are obtained from a species selected from the group consisting of high-node (*Phyllostachys promineus*), thunder (*P. praecox f. prevenalis*), red (*P. iridescens*), and mixtures thereof. These bamboo species each include a jointed culm (the visible above-ground portion of the bamboo plant) and a subterranean jointed rhizome whose buds develop into new plants. Generally, these bamboo species can be grown in tropical or subtropical regions of the world, and are native to Africa, South America, the South Pacific, and various Asian countries including, but not limited to, China, India, and Japan. In the past, vegetable bamboo plants have been planted, for example, in China, for bamboo shoot production which is highly profitable as a vegetable. The remaining culms of these vegetable bamboo plants, however, are regarded as a by-product and are burned by farmers as a low-cost fuel, for example.

The culms of vegetable bamboo grow very quickly and can reach a final height and diameter within as little as about five weeks to about eight weeks. However, unlike hemp and kenaf, vegetable bamboo require about three years to about five years to mature. Despite the longer maturation period, vegetable bamboo are believed to be a more plentiful resource for fiber, than are wood-based plants, such as southern pine trees which typically require about 20 to about 25 years to produce an annual yield of about 10 tons/acre.

The vegetable bamboo fibers for use in the invention preferably have an average fiber length of about 0.2 mm to about 0.8 mm, and more preferably the fibers have an average fiber length of about 0.5 mm to about 0.75 mm. The fibers as obtained from the culms of vegetable bamboo plants can be refined to a desired size by one or more conventional refiners such as, for example, a pressurized refiner, an atmospheric refiner, a mechanical refiner, and/or a thermochemical refiner. More specifically, bamboo stems of about ½-inch to about 2.5 inches in diameter and about 6 feet to about 7 feet in length, and having a moisture content of about 15% are chipped by 3-inch and 4-inch disc chippers. The chips are soaked in water at room temperature for about 4 hours to about 12 hours.

After soaking in water the chips are refined to the desired fiber size by two refining plates (Type C and Type D plates). Type C plates have open end rims which provide shorter retention times during refining and render longer but coarser fibers. Type D plates have one side with sealed end rim which provides longer retention times during refining and render shorter and finer fibers and smaller particle size for bamboo nodes.

The chemical composition of vegetable bamboo fibers is generally similar to that of most wood-based fibers, with the exception that vegetable bamboo fibers contain extractives (see Table V, below). While there may be some compositional similarities between the fibers obtained from vegetable bamboo and those obtained from wood, the physical structure of bamboo is noticeably different from that of wood, in that the culm is divided into sections by highly-lignified nodes. Furthermore, the hardness of the bamboo culm is largely determined by the amount of vascular bundles and their scattering pattern on the cross-section of the culm. The balance of each of the materials listed in Table V comprises water.

cleavage value of about 65 pounds (about 29 kg) to about 95 pounds (about 43 kg), and preferably about 67.2 pounds (about 30.5 kg) to about 92.5 pounds (about 42 kg). Additional, exemplary physical property data for products prepared using each of the three vegetable bamboo species are provided below in Table VI.

TABLE VI

| Vegetable Bamboo Species | OOP Caliper (inches) | OOP Specific Gravity | 24-hour Weight Gain (%) | 24-hour Caliper Swell (%) | Internal Bond Strength (psi) | Cleavage (lbs) | Modulus of Elasticity (psi) | Modulus of Rupture (psi) | Smoothness Value |
|---|---|---|---|---|---|---|---|---|---|
| Thunder (A) | 0.127 | 1.03 | 25.5 | 14.1 | 364 | 79.9 | 657 | 7024 | — |
| Thunder (B) | 0.127 | 1.03 | 25.3 | 13.5 | 288 | 76.8 | 611 | 6506 | — |
| Thunder (C1)* | 0.125 | 1.04 | 24.8 | 12.1 | 399 | 92.5 | 634 | 6704 | 1.7–8.3 |
| Thunder (C2)** | 0.125 | 1.04 | 25.1 | 12.5 | 316 | 34.9 | 613 | 6107 | 1.7–8.3 |
| High-Node | 0.125 | 1.04 | 28.7 | 16.4 | 234 | 72.3 | 539 | 4849 | 1.8–8.6 |
| Red | 0.128 | 1.01 | 28.5 | 15.2 | 172 | 76.2 | 556 | 5027 | 2–8.8 |
| Mixture*** | 0.129 | 1.01 | 26.7 | 15.4 | 162 | 67.2 | 523 | 4785 | 2–8.9 |

*= Tempered
**= Untempered
***= 1:1:1 weight ratio of Thunder (C1):High-Node:Red.

TABLE V

| Constituent (wt. %) | Vegetable Bamboo Fiber | Eucalyptus | Pine |
|---|---|---|---|
| Lignin | 22 to 26.2 | 26 | 28 |
| Cellulose | 39 to 60 | 46 | 42 |
| Hemicellulose | 18.9 to 22.5 | 27 | 25 |
| Ash | 0.7 to 2.7 | 1 | 1 |
| Extractives | 6.1 to 9.7 | 0 | 0 |

A formed article using vegetable bamboo fibers may have a smoothness value of about 2 to about 9, and preferably about 2 to about 4.2. Additionally, the formed article typically has an internal bond strength of about 160 psi (about 1103 kPa) to about 400 psi (about 2758 kPa), preferably about 180 psi (about 1241 kPa) to about 375 psi (about 2585 kPa), and more preferably about 225 psi (about 1551 kPa) to about 375 psi (about 2585 kPa). The article may have a Suitable (thermosetting) binder resins generally include, but are not limited to, amino resins, phenolic resins, and derivatives and mixtures thereof, which are described, for example, in Kirk-Othmer Encyclopedia of Chemical Technology, Vol. 15, pp. 176–208 (2d. ed. 1970). Preferred resins for use in accordance with the invention include phenolic resins, including modified phenolic resins. Preferred phenolic resins include those described in Teodorczyk U.S. Pat. No. 5,367,040, the disclosure of which is hereby incorporated herein by reference. While the phenolic resin may be in a powdered, high molecular weight form, the powdered form typically is more expensive to manufacture and, therefore, an aqueous form of the resin is generally preferred.

Many suitable phenolic resins are available commercially. Generally, a phenolic resin is a reaction product of a phenolic component and an aldehyde, the reaction occurring in the presence of an alkaline compound. The phenolic component of the phenolic resin for use in accordance with the invention may include phenol, cresol, xylenols, other substituted phenols, and/or mixtures thereof. Examples of substituted phenols include o-cresol, p-cresol, p-tertbutylphenol, p-nonylphenol, p-dodecylphenol, and bi-functional xylenols (e.g., 3,5-xylenols). A mixture of cresols, phenol, and xylenols (commonly known as cresylic acid) may be useful in accordance with a commercial scale practice of the inventive method due to its abundance and relatively low cost.

The aldehyde component of the phenolic resin for use in accordance with the invention is not limited to aldehyde itself, but encompasses any aldehyde, formaldehyde, and derivatives thereof which are known to be useful in conjunction with the manufacture of phenolic resins. Thus, references herein to the aldehyde component of the resin include aldehydes, formaldehydes, and derivatives thereof. Formaldehyde is the preferred aldehyde. Derivatives of formaldehyde include, for example, paraformaldehyde, hexamethylenetetramine, acetaldehyde, glyoxal, and furaldehyde.

By way of example, the ratio of the aldehyde component to the phenolic component may be in a range of about 2.0 moles aldehyde or less per mole of phenolic component, more specifically about 0.5 moles to about 1.2 moles aldehyde per mole of phenolic component, for example, about 0.8 moles to about 1.0 moles aldehyde per mole of phenolic component. If a bi-functional phenolic compound is used (e.g., 3,5-xylenols), the equivalent molar ratio (i.e., the ratio of moles of aldehyde to the number of free positions on the phenolic ring available for reaction with the aldehyde) can be in a range of about 0.4:1 to about 0.66:1. However, the invention is not limited to these ranges.

As noted above, formation of the phenolic resin for use in accordance with the invention occurs in the presence of an alkaline compound (sometimes referred to as "caustic") that is used: (a) to achieve methylolation of the phenol; (b) to speed the reaction between the aldehyde and phenolic compound; and, (c) to solubilize the formed resin. Various suitable alkaline compounds are known in the art, and include, for example, sodium hydroxide, potassium hydroxide, or mixtures thereof. Although higher proportions of caustic may be used and those skilled in the art will be able to select suitable caustic levels, the amount of caustic added to the phenolic/aldehyde mixture may be in a range of about 0.05 moles to about 0.2 moles of alkaline compound per mole of phenolic compound. Such an amount of caustic generally assures very beneficial properties of the formed product while allowing for a sufficiently rapid resin cure.

Optionally, an amount of dihydroxybenzene modifier (e.g., resorcinol) may be added to the phenolic resin. Examples of dihydroxybenzenes include resorcinol, hydroquinone, and catechol. Unsubstituted and substituted resorcinols including mixtures thereof, also may be used. The reaction between the phenolic resin and the modifier preferably occurs without the further addition of caustic, until a desired chain length is reached to produce a modified phenolic resin. Though resorcinol is the preferred modifier compound, other modifier compounds that may be reacted with a phenol-formaldehyde resin include aminophenols and phenylenediamines. Examples of aminophenols include ortho-hydroxyaniline, meta-hydroxyaniline, and para-hydroxyaniline. Examples of phenylenediamines include ortho-phenylenediamine, meta-phenylenediamine, and para-phenylenediamine. When included, the modifier compound is preferably present in a range of about one mole to about ten moles of the phenol compound per mole of resorcinol, and preferably about five moles to about ten moles phenol per mole of resorcinol. The molar ratio of aldehyde to total phenolics (i.e., the phenolic components plus dihydroxybenzene modifier) is preferably greater than about 1:1, more preferably is in a range of about one mole to about 1.8 moles formaldehyde per mole of phenolics, and most preferably about 1.1 moles to about 1.4 moles formaldehyde per mole phenolics.

Generally, the thermosetting binder resin is present in the pre-consolidated mat in an amount of about 2 wt. % to about 8 wt. %, based on the weight of the fibrous material prior to cure and, preferably, in an amount of about 3 wt. % to about 7 wt. %.

A sizing agent preferably is incorporated into the pre-consolidated mat with the fibrous material and the thermosetting binder resin. The sizing agent is used to cover surfaces of the individual fibers thereby reducing the surface energy of the fibers, and rendering the fibers hydrophobic. Rendering the fibers hydrophobic enables better control of linear expansion, thickness swelling, surface deterioration, and strength loss caused by the swelling of fibers absorbing water. Additionally, hydrophobic, consolidated articles are more amenable to the application of sealers, paints, and other finishing coatings because these materials do not penetrate or soak into the consolidated fibrous mat. Suitable sizing agents include waxes of relatively high molecular weights (e.g., about 200 to about 1000) obtained as the residues or distillates of crude oil. Such waxes preferably are chemically inert and water-insoluble. Such waxes are commercially-available under the tradename CITGO 60/40 from Citgo. When used, the sizing agent is present in the pre-consolidated mat in an amount of about one percent by weight (wt. %) to about 3 wt. %, based on the weight of the fibrous material prior to cure, and more preferably in an amount of about 1.5 wt. % to about 2.5 wt. %.

The mat is placed and/or formed in a mold of suitable pressing apparatus and consolidated to form the molded composite article. The pressing apparatus preferably has press platens capable of operating at a temperature in a range of about 125° F. (about 52° C.) to about 500° F. (about 260° C.), preferably about 375° F. (about 190° C.) to about 450° F. (about 232° C.), and more preferably about 400° F. (about 204° C.) to about 425° F. (about 218° C.). The press platen operating temperature will likely depend on the type of thermosetting binder resin and particular fiber used, for example.

Press times generally are relatively short, and are preferably in a range of about 30 seconds to about three minutes, preferably about 60 seconds to about 150 seconds, and more preferably about 60 seconds to about 90 seconds. A preferred press operation includes a three-stage press cycle of about 60 seconds to about 90 seconds wherein a first stage includes a press cycle time of about 10 seconds to about 20 seconds, a second stage includes a breathing time period of about 30 seconds to about 40 seconds, and a third stage includes a press cycle time of about 20 seconds to about 30 seconds. During the second stage breathing time period the pressure exerted by the press platens on the mat is reduced by about 50 psi to about 200 psi, preferably by about 75 psi to about 100 psi. A more preferred press operation includes a press cycle time of about 70 seconds to about 80 seconds.

These consolidation parameters, however, are variable depending upon the materials and apparatus being used. As will be apparent to those of ordinary skill in the art, desirable pressing temperatures vary according to, but not limited to, the following criteria: the thickness of the composite; the type of fibrous material being pressed; the moisture content of the fibrous material; the press time; and the specific thermosetting binder resin.

Alternatively, steam injection press methods can be used to consolidate a mat comprising the fibrous material, resin, and sizing agent. In the steam injection method, the mat is introduced into a suitable pressing apparatus having perforated press platens and steam injection capability. Steam is injected into the mat through the press platens so as to cure the resin. The steam injection press apparatus may include press platens having apertures, one of the platens being used for injecting the steam through the apertures, and another platen (e.g., a bottom platen) being used to vent the steam or liquid condensate through the apertures. In such an embodiment, the steam may enter the top side of the mat evenly over its entire surface, then flow from the top surface to the bottom surface, and finally exit through the bottom platen. Alternatively, the steam may be injected and exhausted through the same (e.g., bottom) platen.

The pressure in the press is preferably in a range of about 100 pounds per square inch gauge (psig) to about 400 psig, and more preferably in a range of about 200 psig to about 300 psig. The temperature of the steam is preferably in a range of about 300° F. (about 150° C.) to 390° F. (about 200° C.), while the press platens are preferably at a temperature of about 300° F. (about 150° C.) to 390° F. (about 200° C.). Press times generally are relatively short, and are preferably in a range of about fifteen seconds to about five minutes, and more preferably about twenty seconds to about one minute, e.g. about thirty seconds. However, these press times, temperatures, and pressures may be adjusted depending upon the fibrous materials, the particular thermosetting binder resin, and the apparatus being used. For example, as will be apparent to those having ordinary skill in the art, desirable press temperatures vary according to various factors, such as the thickness of the mat to be pressed, the type of fibrous material being pressed, the moisture content of the fibrous material, the desired press time, and the type of resin used.

Process parameters and apparatus for steam injection pressing are described more fully in K. Walter, *Steam Pressing Experience from Operating Plants and Future Possibilities*, (G. Siempelkamp Gmbh and Co.) and in U.S. Pat. Nos. 5,195,428; 5,134,023; and 4,890,849, the respective disclosures of which are hereby incorporated herein by reference.

After the consolidation step, the formed composite article is removed from the press and cooled to ambient temperature. The molded composite article made from hemp hurd and/or kenaf hurd has superior surface quality which helps achieve a higher coating quality which in turn adds more value to the finished product.

The formed composite articles can have a density akin to medium density boards (i.e., a density in a range of about 30 pounds per cubic foot (lbs/ft³) to about 45 lbs/ft³) or high density boards (i.e., a density of about 45 lbs/ft³ or greater). Furthermore, the formed composite articles can have various thicknesses, ranging from about ⅛-inch to about two inches, and more specifically the articles can have thickness of about ⅛-inch, ¼-inch, ⅓-inch, ⅜-inch, ½-inch, ⅝-inch, ⅔-inch, ¾-inch, ⅞-inch, 1-inch, 1¼-inches, 1⅓-inches, 1⅜-inches, 1½-inches, 1⅝-inches, 1⅔-inches, 1¾-inches, 1⅞-inches, 2-inches. These composites can be used as columns, floors, floor underlayment, roof sheathings, ceilings, walls, partition systems, doors, doorskins, and stairs in the construction of homes, offices, and other types of buildings, as well as furniture components, such as chairs, tables, countertops, cabinets, and cabinet doors, and other uses, such as bulletin boards, for example.

The foregoing description is given for clearness of understanding only, and no unnecessary limitations should be understood therefrom as modifiications within the scope of the invention may be apparent to those having ordinary skill in the art.

What is claimed is:

1. A fibrous composite article comprising fibrous material having an average fiber length of less than about 2 millimeters (mm) and a cured, thermosetting binder resin selected from the group consisting of amino resins, modified amino resins, phenolic resins, modified phenolic resins, and mixtures thereof, wherein the fibrous material comprises a species selected from the group consisting of hemp hurd, kenaf hurd, vegetable bamboo culms, and mixtures thereof, the article having a density of at least about 45 lb/ft³.

2. The article of claim 1 comprising fibrous material having an average fiber length of about 0.3 mm to about 1.6 mm and said binder resin, is present in an amount of about 2 wt. % to about 8 wt. %, based on the weight of the fibrous material prior to cure.

3. The article of claim 1, wherein the fibrous material has a specific gravity of about 1 to about 1.2.

4. The article of claim 1, wherein the fibrous material has a pre-consolidation moisture content of about 3 wt. % to about 5 wt. %.

5. The article of claim 1, wherein the fibrous material has a pre-consolidation moisture content of about 4 wt. % to about 4.5 wt. %.

6. The article of claim 1, further comprising a sizing agent in an amount of about 1 wt. % to about 3 wt. %, based on the weight of the fibrous material prior to cure.

7. The article of claim 1, further comprising a sizing agent in an amount of about 1.5 wt. % to about 2.5 wt. %, based on the weight of the fibrous material prior to cure.

8. The article of claim 2, wherein the fibrous material comprises hemp hurd and the fibers have an average fiber length of about 0.5 mm to about 0.75 mm and the article contains the cured, binder resin in an amount of about 4 wt. % to about 6 wt. %, based on the weight of the fibrous material prior to cure.

9. The article of claim 8 having a smoothness value of about 2.1 to about 3.8.

10. The article of claim 8 having an internal bond strength of about 140 pounds per square inch (psi) to about 250 psi.

11. The article of claim 8 having a cleavage value of about 45 pounds to about 65 pounds.

12. The article of claim 2, wherein the fibrous material comprise kenaf hurd and the fibers have an average fiber length of about 0.5 mm to about 0.75 mm and the article contains the cured, binder resin in an amount of about 4 wt. % to about 6 wt. %, based on the weight of the fibrous material prior to cure.

13. The article of claim 12 having a smoothness value of about 2 to about 5.

14. The article of claim 13 having a smoothness value of about 2.5 to about 4.2.

15. The article of claim 12 having an internal bond strength of about 210 psi to about 290 psi.

16. The article of claim 15 having an internal bond strength of about 218 psi to about 279 psi.

17. The article of claim 12 having a cleavage value of about 82 pounds to about 100 pounds.

18. The article of claim 17 having a cleavage value of about 82 pounds to about 95.7 pounds.

19. The article of claim 12 further comprising a wood species selected from the group consisting of aspen, birch, hackberry, fir, hickory, maple, mulberry, oak, pine, and sycamore.

20. The article of claim 19 wherein the wood species is present in a wood species:kenaf weight ratio of about 0.25:1 to about 0.67:1.

21. The article of claim 2, wherein the fibrous material comprises culms of a species of vegetable bamboo selected from the group consisting of high-node (*Phyllostachys promineus*), thunder (*P. praecox f. prevenalis*) red (*P. iridescens*), and mixtures thereof.

22. The article of claim 21, wherein the fibrous material has an average fiber length of about 0.5 mm to about 0.75 mm and the article contains the cured, thermosetting binder resin in an amount of about 4 wt. % to about 6 wt. %, based on the weight of the fibrous material prior to cure.

23. The article of claim 21 having a smoothness value of about 2 to about 9.

24. The article of claim 23 having a smoothness value of about 2 to about 4.2.

25. The article of claim 21 having an internal bond strength of about 160 psi to about 400 psi.

26. The article of claim 25 having an internal bond strength of about 180 psi to about 375 psi.

27. The article of claim 26 having an internal bond strength of about 225 psi to about 375 psi.

28. The article of claim 21 having a cleavage value of about 65 to about 95.

29. The article of claim 28 having a cleavage value of about 67.2 to about 92.5.

30. A fibrous composite article comprising fibrous material having an average fiber length of about 0.3 mm to about 1.6 mm, and a binder resin in an amount of about 2 wt. % to about 8 wt. % based on the weight of the fibrous material prior to cure, wherein the fibrous material comprises culms of a species of vegetable bamboo selected from the group consisting of high-node (*Phyllostachys promineus*), thunder (*P. praecox f. prevenalis*) red (*P. iridescens*), and mixtures thereof.

31. The article of claim 30 having a smoothness value of about 2 to about 9.

32. The article of claim 30 having an internal bond strength of about 160 psi to about 400 psi.

33. The article of claim 30 having a cleavage value of about 65 to about 95.

34. A fibrous composite article comprising fibrous material having an average fiber length of about 0.5 mm to about 0.75 mm, and a binder resin in an amount of about 4 wt. % to about 6 wt. % based on the weight of the fibrous material prior to cure, wherein the fibrous material comprises kenaf hurd, said article further comprising a wood species selected from the group consisting of aspen, birch, hackberry, fir, hickory, maple, mulberry, oak, pine, and sycamore.

35. The article of claim 34 wherein the wood species is present in a wood species:kenaf weight ratio of about 0.25:1 to about 0.67:1.

* * * * *